3,567,829
COMPOSITION AND METHOD FOR CONTROLLING INFLUENZA A$_2$ VIRUS INFECTIONS WITH 2-AZA-ADAMANTANE
Andre R. Gagneux, Basel, Switzerland, assignor to Geigy Chemical Corporation, Ardsley, N.Y.
No Drawing. Filed Oct. 7, 1968, Ser. No. 765,650
Claims priority, application Switzerland, Oct. 13, 1967, 14,366/67
Int. Cl. A61k *27/00*
U.S. Cl. 424—267    3 Claims

ABSTRACT OF THE DISCLOSURE 2-aza-adamantane possesses anti-influenza A$_2$ viral properties. Pharmaceutical compositions comprising this compound and the use thereof are provided.

---

The present invention relates to anti-influenza A$_2$ viral compositions and to a method of controlling influenza A$_2$ virus infections in mammals.

More particularly the present invention pertains to anti-influenza A$_2$ viral compositions containing as active compound 2-aza-adamantane or a pharmaceutically acceptable acid addition salt thereof. 2-aza-adamantane has a relative low order of toxicity wherefor it is useful for controlling infections caused by influenza viruses of the strain A$_2$.

The antiviral activity of 2-aza-adamantane is illustratively demonstrated in mice by the following test. A control group of ten mice of the strain NMRI is infected intranasally with a suspension of influenza virus A$_2$/Bethesda/10/63 with a dose being just lethal. To a test group of ten mice of the same strain is administered either subcutaneously or orally 0.5 ml. of a sterile water solution of 2-aza-adamantane (as hydrochloride) of the appropriate concentration. Thirty minutes thereafter is intranasally administered to this test group the same amount of the virus preparation which has been administered to the control group. The test group is then treated on each of the consecutive three days with the same amount of drug via the same route as on the first day. The mean survival time of each group is determined. The prolongation of the survival time of the test group over the control group is a measure of the antiviral effect of the test compound.

Thus it is found that 2-aza-adamantane hydrochloride on subcutaneous administration of daily 4× 50 mg./kg. prolongates the survival time of virus infected test animals to a significant extent. A similar prolongation of the survival time is obtained on oral administration of the compound in daily dosages of 4× 25 to 4× 50 mg./kg.

2-aza-adamantane (as hydrochloride) is shown in similar tests to be also active against influenza virus A$_2$/Taiwan/2/62 and influenza virus A$_2$/Singapur/1/57.

The toxicity of the test compound is demonstrated in mice and is of favourable low order.

For its intended use 2-aza-adamantane or its pharmaceutically acceptable acid addition salts are administered by any of the commonly used routes, particularly orally, rectally or parenterally, for example, intra muscularly, intraveously, via the membranes of nose, mouth and throat or via the air passages. In general 2-aza-adamantane is used in daily dosages of about 1 to about 100 mg. per kg. of bodyweight, preferably of about 1 to about 20 mg. per kg. The same dosages apply to the pharmaceutically acceptable acid addition salts of 2-aza-adamantane. If the acid constituents form an appreciable part of the whole active substance, the dosages are correspondingly increased.

The 2-aza-adamantane and the hydrochloride thereof are known substances, the production of which has been described by H. Stetter et al., Chem. Ber. 97, 3480–3487 (1964).

Applicable as active substances of antiviral medicaments according to the invention, are in addition to the free 2-aza-adamantane the pharmaceutically acceptable acid addition salts thereof derived from acids such as hydrochloric acid, hydrobromic acid, sulfuric acid, phosphoric acid, methanesulfonic acid, ethanesulfonic acid, 2-hydroxyethanesulfonic acid, acetic acid, lactic acid, succinic acid, fumaric acid, maleic acid, malic acid, tartaric acid, citric acid, benzoic acid, salicyclic acid, phenyl acetic acid, mandelic acid, and embonic acid.

Suitable dosage units, such as dragees, tablets, capsules, suppositories or ampoules, contain as active substance, e.g. 5–500 mg., preferably 25–250 mg. of 2-aza-adamantane or of a pharmaceutically acceptable salt thereof. A further possibility is the application of corresponding amounts of multidosage forms of administration, such as syrups, sprays, tinctures, aerosols, ointments or powders.

Dosage units for peroral administration preferably contain between 10% and 90% of active substance. Tablets or dragée cores are produced from the active substance and e.g. solid, pulverulent carriers, such as lactose, saccharose, sorbitol, mannitol; starches such as potato starch, maize starch or amylopectin; laminaria powder or citrus pulp powder; cellulose derivatives or gelatine, optionally with the addition of lubricants, such as magnesium or calcium stearate or polyethylene glycols. Dragée cores are coated for example with concentrated sugar solutions which can also contain, e.g. gum arabic talcum and/or titanium dioxide, or with a lacquer dissolved in easily volatile organic solvents or mixtures of solvents. Dyestuffs can be added to these coatings to indicate various dosages of active substance. Other suitable dosage units for oral administration are hard gelatine capsules and soft closed capsules made of gelatine and a softener such as glycerine. The hard gelatine capsules preferably contain the active substance as a granulate mixed with lubricants, such as talcum or magnesium stearate, and optionally stabilisers such as sodium metabisulfite (Na$_2$S$_2$O$_5$) or ascorbic acid. In soft capsules, the active substance is preferably dissolved or suspended in suitable liquids, such as l iquid polyethylene glycols, whereby likewise stabilisers can be added.

Suitable dosage units for rectal administration are suppositories, consisting of a combination of an active substance with a suppository base consisting of natural or synthetic triglycerides, e.g. cocoa butter, polyethylene glycols or suitable higher fatty alcohols, and gelatine rectal capsules consisting of a combination of the active substance and polyethylene glycols.

Ampoules for parenteral, particularly for intramuscular or intravenous administration contain 2-aza-adamantane either as a free base in form of for example an aqueous dispersion, produced from the free base and commonly used solvents and/or emulsifying agents and optionally stabilisers, or as a pharmaceutically acceptable acid addition salt thereof in form of an aqueous solution. The concentration of active compounds in the dispersion or solution is preferably about 0.5 to 5%.

The following examples further illustrate the production of pharmaceutical compositions but should not be construed as a limitation on the scope thereof.

EXAMPLE 1

500 g. of active substance, e.g. 2-aza-adamantane hydrochloride, are mixed with 550.0 g. of lactose and 292.0 g. of potato starch. The mixture is moistened with an alcoholic solution of 8 g. of gelatine and granulated through a sieve. After drying, 60.0 g. of potato starch, 60.0 g. of talcum, 10.0 g. of magnesium stearate and 20.0 g. of colloidal silicon dioxide are mixed in. From the mixture are pressed 10,000 tablets each weighing 150 mg. and each containing 50 mg. of active substance (hydrochloride). If desired, the tablets may be grooved for more accurate adjustment of the dosage amount.

EXAMPLE 2

A granulate is prepared from 500 g. of active substance, e.g. 2-aza-adamantane hydrochloride, 379.0 g. of lactose and an alcoholic solution of 6.0 g. of gelatine. After drying, the granulate is mixed with 10.0 g. of colloidal silicon dioxide, 40.0 g. of talcum, 60.0 g. of potato starch and 5.0 g. of magnesium stearate. From the mixture are pressed 10,000 dragée cores which are subsequently coated with a concentrated syrup consisting of 533.5 g. of crystallized saccharose, 20.0 g. of shellac, 75.0 g. of gum arabic, 250.0 g. of talcum, 20.0 g. of colloidal silicon dioxide and 1.5 g. of dyestuff and dried. The obtained dragées each weight 190 mg. and each contain 50 mg. of active substance.

EXAMPLE 3

100.0 g. of 2-aza-adamantane hydrochloride are dissolved in 1500 ml. of boiled, pyrogen-free water and the solution made up to 2000 ml. with the same kind of water. The solution is filtered and poured out to give 1000 ampoules of 2 ml. which are consequently sterilized. A 2 ml. ampoule contains as active substance 100 mg. or 5% or 2-aza-adamantane hydrochloride.

EXAMPLE 4

50 g. of 2-aza-adamantane hydrochloride and 1950 g. of finely ground suppository base substance (e.g. cocoa butter) are thoroughly mixed and then melted. From the melt, which is maintained homogenous by stirring, are poured 1000 suppositories each weighing 2.0 g. and each containing 50 mg. of active substance.

What is claimed is:

1. A pharmaceutical composition in the form of dragées, tablets, capsules or suppositories for controlling influenza $A_2$ infection comprising 2-aza-adamantane or a pharmaceutically acceptable acid addition salt thereof in an amount effective against said virus and a pharmaceutical carrier.

2. A method of controlling infections caused by influenza virus $A_2$ in a mammal, comprising administering to said mammal an antivirally effective amount of 2-aza-adamantane or a pharmaceutically acceptable acid addition salt thereof.

3. A method according to claim 2 wherein said virus is influenza virus $A_2$/Bethesda/10/63, influenza virus $A_2$/Taiwan/2/63 or influenza virus $A_2$/Singapur/1/57.

References Cited

H. Stetter et al., Chem. Ber. 97, 3480–3487 (1964).

Awdrewes, Viruses of Vertebrates, Williams and Wilkins Co., Baltimore, 1964, pp. 171–180.

JEROME D. GOLDBERG, Primary Examiner